Oct. 12, 1954
E. A. TURNER
2,691,351
APPARATUS FOR WORKING DOUGH
Filed April 22, 1950
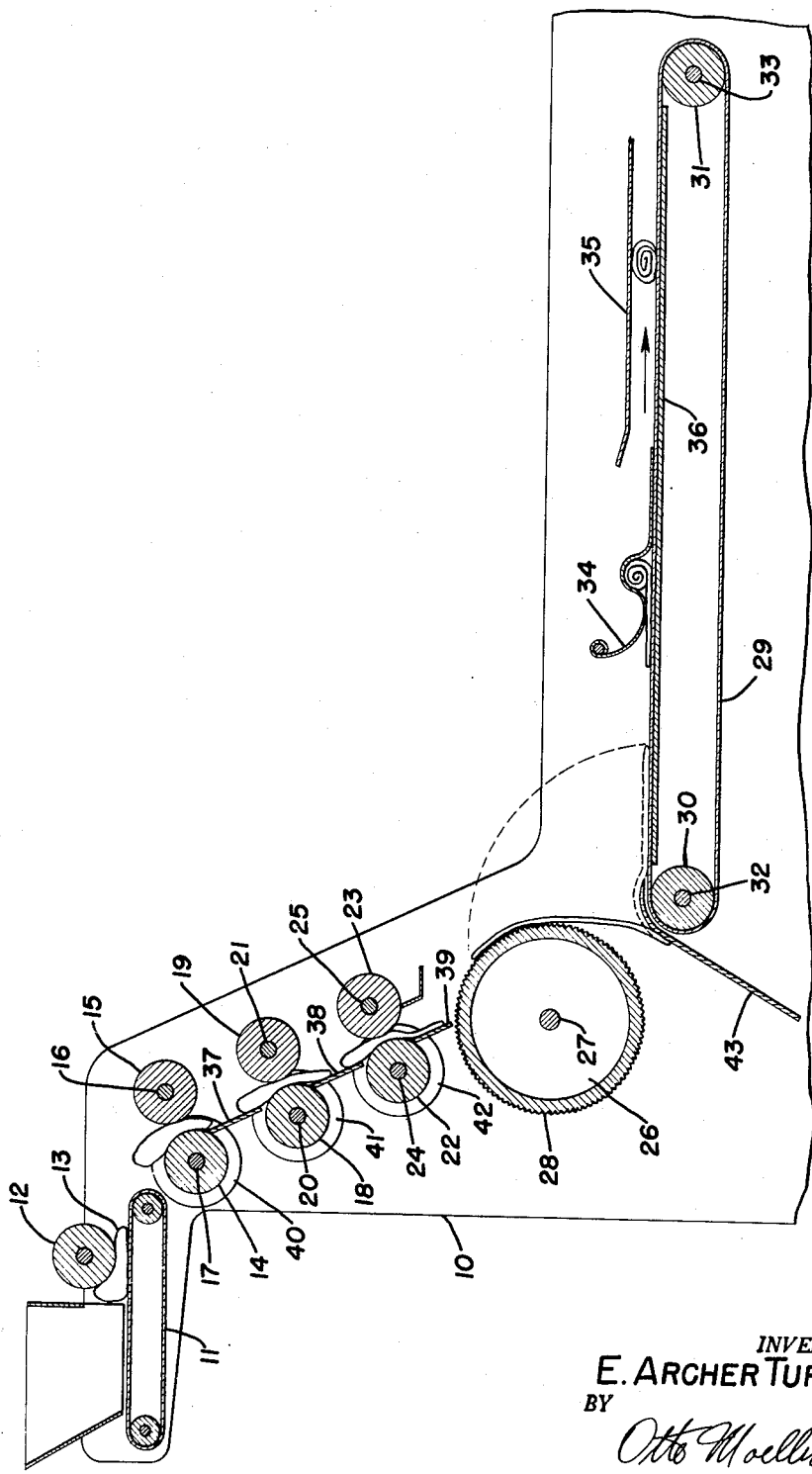
INVENTOR.
E. ARCHER TURNER
BY
Otto Moeller
Attorney Patented Oct. 12, 1954

2,691,351

UNITED STATES PATENT OFFICE 2,691,351

APPARATUS FOR WORKING DOUGH

Edwin Archer Turner, Hartsdale, N. Y., assignor to The Standard Stoker Company, Incorporated, a corporation of Delaware Application April 22, 1950, Serial No. 157,508

3 Claims. (Cl. 107—12)

This invention relates to apparatus for the molding and preparing of dough pieces into loaves preparatory to baking.

In the molding of dough in the bread making art, it has been customary to pass segregated lumps of dough through successive pairs of sheeting rollers whereby the dough is compressed into elongated flattened sheets. During this sheeting operation the same end of the dough sheet is initially engaged by each set of rollers so that, in each sheeting operation, moisture contained in the dough sheet is forced from the leading end portion of the dough sheet towards the trailing end portion thereof. In the subsequent curling or coiling operation, the same end of the dough sheet that was initially engaged by the sheeting rollers, and from which moisture has been forced, is engaged by the curling device and the sheet is curled with this end in the middle of the completed loaf. It has been found that this end with the lower concentration of moisture, is the poorest conditioned end, and being sealed into the center of the loaf, automatically introduces the poorest conditions into the area where the finest grain and texture is wanted.

In another dough molding practice, it has been proposed to curl the dough sheet in a direction transverse with respect to the direction of travel of the dough sheet through the sheeting rollers. As a result, the finished loaf will have at its one end the moisture concentrated end of the dough sheet, and at its opposite end that end of the dough sheet from which the moisture has been forced in the sheeting operation, so that the baked loaf will not be uniform in texture from end to end and will always be inferior at one end. In this cross curling method, the degree of thinness to which the dough sheet can be rolled and consequently the number of convolutions that the curled loaf may comprise is strictly limited, since the length to which the dough piece can be sheeted is limited to the length of the baking pans.

My invention overcomes the aforementioned shortcomings and has as an object the provision of an improved dough working apparatus that will produce a loaf of bread having an evenness of cellular structure and uniformity of fine grain structure longitudinally from end to end of the loaf.

Another object of the invention is to provide apparatus whereby that end portion of a sheeted dough piece having the higher concentration of moisture is sealed in the center of and from end to end of the loaf of bread. Following definite laws of vapor tension, this concentration of moisture diffuses outwardly during the proofing and baking process, but since its point of origin is at the center of the loaf, this center will always remain moist until all moisture has diffused outwardly to the surface and from there into the air, whereby the keeping qualities of the bread are greatly enhanced.

Another object of the invention is to provide a simple, compact and efficient dough working machine wherein a plurality of sets of sheeting rollers compress successive dough pieces to a desired degree of thinness and desired length even exceeding the pan length; wherein the dough sheets are flipped end for end and deposited flatwise on and uniformly accurate between the sides of the upper run of a belt traveling in the direction of sheeting; and wherein the dough sheets are curled with the previously trailing end of the dough sheet coiled in the center of the loaf.

Another object of the invention is to provide a dough working machine of the type described in which doubles are diverted from the traveling belt.

With these and other objects in view, and to the end of providing a dough working machine which is simple in construction and reliable in operation, the invention further consists in certain features of construction and combination of parts that will become apparent from the following description when considered with the accompanying drawing, in which the figure is a sectional view through the dough working machine diagrammatically showing the progress of the dough pieces therethrough.

In the drawing there is shown a dough working machine embodying a housing 10, in the base of which is mounted a motor (not shown) for driving the various moving parts of the machine. Suitable drive connections are employed for operating the various moving parts in correlated timed relation but are not shown since they are well known in the art and constitute no novel part of the present invention.

At the upper rearward end of the machine there is mounted a horizontal endless conveyor belt 11 arranged to receive at one end thereof successive uniformly spaced masses of dough from a conventional dough dividing machine and to deliver said masses of dough to the first pair of a plurality of pairs of cooperating compressing or sheeting rollers. A preliminary flattening roller 12 is preferably mounted over the conveyor belt 11 near its delivery end to initially flatten the dough piece 13 to facilitate entrance of the dough piece between the first pair of sheeting rollers.

The first pair of sheeting rollers 14 and 15 are mounted on shafts 16 and 17 directly forward of and slightly below the level of the conveyor 11 in position to receive the dough piece 13. A second set of sheeting rollers 18 and 19 are mounted on shafts 20 and 21, and are disposed below and slightly forward of the sheeting rollers 14 and 15. A third and final set of sheeting rollers 22 and 23 are mounted on shafts 24 and 25, and are disposed below and slightly forward of the sheeting rollers 18 and 19. The arrangement of the sheeting rollers is such as to define a downwardly sloping passageway for the sheets of dough.

In order to sheet the dough to the desired degree of thinness, suitable means well known in the art, and consequently not shown, may be employed for adjusting the spacing between the rollers 14 and 15, the rollers 18 and 19, and between the rollers 22 and 23.

A drum 26 mounted on the shaft 27 is disposed beneath and slightly forward of the sheeting rollers 22 and 23 with a portion of the peripheral surface extending across the downwardly sloping passageway defined by the sets of sheeting rollers. The surface of drum 26 is preferably provided with serrations 28 to insure proper engagement of the elongated dough sheets with the drum and to prevent slippage of the sheets down around the drum.

Beneath and extending horizontally forward of the drum 26 is an endless belt conveyor 29 trained over the longitudinally spaced rollers 30 and 31. The rollers 30 and 31 are mounted on shafts 32 and 33, one of which, preferably shaft 33 is arranged to be driven, in well known manner, for operating the belt conveyor 29 in the direction indicated by the arrow. Mounted over the top run of conveyor belt 29 is a curling mat 34 and a pressure board 35. A plate 36 supports the top run of the conveyor belt 29.

Guide plates 37, 38 and 39 are provided respectively between the first and second sets of sheeting rollers 14, 15 and 18, 19; between the second and final sets of sheeting rollers 18, 19 and 22, 23; and between the final set of sheeting rollers 22, 23 and drum 26, in order to facilitate delivery of the dough sheets from one set of rollers to the other and also to drum 26.

In passing through the sheeting rollers, the dough piece may be elongated to any desired length even to the extent of far exceeding the length of the span in which the loaf is to be baked, since the length of the sheeted dough piece bears no relation to the length of the pan. This makes it possible to sheet the dough very thin. The width of the dough sheet is limited by flanges 40, 41 and 42 at the respective ends of the rollers 14, 18 and 22. In the compression and sheeting of the dough pieces, moisture in the dough is forced rearwardly from the leading edge toward the trailing edge of the dough sheet so that the trailing end portion of the dough sheet has the higher concentration of moisture.

The dough sheet emerging from the final set of sheeting rollers 22, 23, is carried around and down on the drum 26 and after the trailing edge has cleared the rollers, the dough sheet is flipped by centrifugal force, trailing end foremost, flatwise on the top run of conveyor belt 36. The dough sheet is now advanced by the belt 36 with the previously trailing end, which carries the higher concentration of moisture, now leading, and as it passes under the curling mat 34 it is coiled into a roll having a number of convolutions and with the moisture concentrated end portion in the center of the loaf. After passing beneath the pressure board, the molded loaf can be automatically panned in known manner.

Below the drum 26 and rearward of the belt supporting roller 30 is a sloping deflecting plate 43, the upper forward end of which curves around the periphery of the roller 30 and is spaced therefrom a distance sufficient to permit unimpeded travel of the belt 36.

The curved portion of the deflecting plate 43 extends forward of the foremost peripheral portion of the drum 26 so that when working dough pieces into long sheets, the leading edge of the dough sheet will be deflected from the conveyor belt 36 thereby precluding the possibility of the leading edge of the dough sheet being conveyed forwardly until the dough sheet has been flipped, trailing edge foremost, flatwise on the belt 36. The deflecting plate 43 also provides for eliminating of doubles, that is, two lumps of dough that pass through the sheeting rollers together. When two such lumps of dough pass through the sheeting rolls together, the resultant sheet will be excessively long, so that a considerable portion of the dough sheet will slide down the deflecting plate 43 before the trailing edge of the dough sheet emerges from the last set of sheeting rolls. Thus, when the sheet is finally flipped, the weight of the unsupported length of the sheet depending along the deflecting plate 43 will cause the sheet to drop by gravity and therefore will preclude its being carried forward by the conveyor belt 36.

The various shafts supporting the sheeting rollers, the drum and the conveyor belt are all in parallel alinement and centered between parallel longitudinal vertical planes, so that the dough pieces are continuously advanced in the same longitudinal plane and can therefore be precisely and uniformly panned.

I claim:

1. For use in a dough working machine of the type having means for compressing a mass of dough into an elongated sheet, the combination of a rotating cylindrical member disposed to receive from said dough compressing means elongated dough sheets on the upper descending portion of its cylindrical surface, means to rotate said cylindrical member at a speed to flip said dough sheet from its surface trailing end foremost, an endless conveyor extending in the direction of elongation of said dough sheet and arranged to receive said sheet trailing end foremost, and a downwardly and rearwardly sloping plate between said rotating member and the rearmost portion of said conveyor for deflecting the leading end of the dough sheet from said conveyor.

2. Apparatus in accordance with claim 1, in which the top run of the conveyor is disposed in a plane below the level of the bottom of said rotating cylindrical member.

3. A dough working machine comprising means for compressing a mass of dough by application of pressure progressively from the leading to the trailing edge of the dough mass to form an elongated sheet, a rotating cylindrical member disposed subjacent said dough compressing means to receive on its surface said elongated sheet leading end foremost, said member upon continued rotation flipping said dough sheet from its surface trailing end foremost, an endless conveyor extending and moving in the direction of elongation of said dough sheet and arranged to receive said sheet with its previously trailing end foremost, a downwardly and rearwardly sloping plate interposed between said rotating member and the rearmost portion of said conveyor for deflecting the leading end of the dough sheet from said conveyor, one end of said plate being of an arcuate configuration and arranged to extend over a portion of said conveyor in spaced relation therewith for directing said dough sheet from said plate onto said conveyor, said compressing means, rotating member and endless conveyor being in alignment and operating in a direction to provide a common path of movement for said dough.

References Cited in the file of this patent

UNITED STATES PATENTS

| Number | Name | Date |
|---|---|---|
| 806,869 | Burns | Dec. 12, 1905 |
| 2,373,012 | Burdett et al. | Apr. 3, 1945 |
| 2,431,074 | Palmer | Nov. 18, 1947 |
| 2,479,864 | Rhodes | Aug. 23, 1949 |
| 2,534,734 | Rhodes | Dec. 19, 1950 |

FOREIGN PATENTS

| Number | Country | Date |
|---|---|---|
| 549,584 | Great Britain | Nov. 27, 1942 |